US012224472B2

(12) United States Patent
Uemichi

(10) Patent No.: US 12,224,472 B2
(45) Date of Patent: Feb. 11, 2025

(54) DIGITAL PHASE SHIFTER

(71) Applicant: Fujikura Ltd., Tokyo (JP)

(72) Inventor: Yusuke Uemichi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 17/922,696

(22) PCT Filed: Aug. 8, 2022

(86) PCT No.: PCT/JP2022/030251
§ 371 (c)(1),
(2) Date: Nov. 1, 2022

(87) PCT Pub. No.: WO2023/153001
PCT Pub. Date: Aug. 17, 2023

(65) Prior Publication Data
US 2024/0222830 A1 Jul. 4, 2024

(30) Foreign Application Priority Data
Feb. 8, 2022 (JP) ................................ 2022-017679

(51) Int. Cl.
*H01P 1/18* (2006.01)
*H01P 5/08* (2006.01)

(52) U.S. Cl.
CPC ................ *H01P 1/184* (2013.01); *H01P 5/08* (2013.01)

(58) Field of Classification Search
CPC ............... H01P 1/18; H01P 1/184; H01P 5/08
USPC ................................ 333/138–140, 156, 161
See application file for complete search history.

(56) References Cited

U.S. PATENT DOCUMENTS

| | | | |
|---|---|---|---|
| 6,816,031 | B1 | 11/2004 | Miller |
| 10,291,282 | B1 | 5/2019 | Lin et al. |
| 2019/0158068 | A1 | 5/2019 | Valdes Garcia et al. |

FOREIGN PATENT DOCUMENTS

| | | | |
|---|---|---|---|
| CN | 106785250 | A | 5/2017 |
| CN | 109616723 | A | 4/2019 |
| CN | 111326839 | A | 6/2020 |
| JP | 2011-259215 | A | 12/2011 |
| JP | 2016-158035 | A | 9/2016 |

OTHER PUBLICATIONS

Ishay B. R., and Elad, D., "PVT Robust Passive Phase Shifter for 5G MIMO Applications", 2020 IEEE 20th Topical Meeting on Silicon Monolithic Integrated Circuits in RF Systems (SIRF), IEEE, Jan. 26, 2020, pp. 13-15, XP033742191, DOI: 10.1109/SIRF46766.2020.9040176 [retrieved on Mar. 17, 2020], cited in EP Office Action dated Oct. 11, 2023. (3 pages).

(Continued)

*Primary Examiner* — Rakesh B Patel
(74) *Attorney, Agent, or Firm* — WHDA, LLP

(57) ABSTRACT

A connecting portion includes a first connection line configured to connect a signal line of a first digital phase shift circuit and a signal line of a second digital phase shift circuit, second connection lines configured to connect inner lines of the first digital phase shift circuit and inner lines of the second digital phase shift circuit, ground layers disposed above and below the first connection line and the second connection lines, and first via holes configured to connect at least the second connection lines and the ground layers.

9 Claims, 6 Drawing Sheets

(56) References Cited

OTHER PUBLICATIONS

Sadhu et al., "A 28-GHz 32-Element TRX Phased-Array IC With Concurrent Dual-Polarized Operation and Orthogonal Phase and Gain Control for 5G Communications", IEEE Journal of Solid-State Circuits, IEEE, USA, Dec. 1, 2017, vol. 52, No. 12, pp. 3373-3391, XP011673305, ISSN: 0018-9200, DOI: 10.1109/JSSC.2017.2766211 [retrieved on Nov. 22, 2017], cited in EP Office Action dated Oct. 11, 2023. (19 pages).

Trent et al., "CPW-stripline transitions on silicon over the 0-20 GHz range", Antennas and Propagation Society International Symposium, 2000. IEEE Jul. 16-21, 2000, Piscataway, NJ, USA, IEEE, Jul. 16, 2000, pp. 2004-2007, XP032400868, DOI: 10.1109/APS.2000.874885 ISBN: 978-0-7803-6369-4, cited in EP Office Action dated Oct. 11, 2023. (4 pages).

International Search Report dated Oct. 4, 2022, issued in counterpart International Application No. PCT/JP2022/030251.

Y. Tousi et al., A Ka-band Digitally-Controlled Phase Shifter with sub-degree Phase Precision (2016, IEEE, RFIC), RTU2C-5; cited in specification.

Yishay, B. R., and Elad, D., "PVT Robust Passive Phase Shifter for 5G MIMO Applications", 2020 IEEE 20th Topical Meeting On Silicon Monolithic Integrated Circuits in RF Systems (SIRF), IEEE, Jan. 26, 2020, pp. 13-15, XP033742191, DOI: 10.1109/SIRF46766.2020.9040176 [retrieved on Mar. 17, 2020], cited in EP Office Action dated Oct. 11, 2023. (3 pages).

DIGITAL PHASE SHIFTER

TECHNICAL FIELD

The present invention relates to a digital phase shifter.

Priority is claimed on Japanese Patent Application No. 2022-017679, filed Feb. 8, 2022, the content of which is incorporated herein by reference.

BACKGROUND ART

Non Patent Document 1, which are described below, discloses digital control type phase shift circuits (digital phase shift circuits) that use high frequency signals such as microwaves, sub-millimeter waves, millimeter waves, or the like. The digital phase shift circuits are actually mounted on a semiconductor substrate in a state in which digital phase shift circuits are cascade-connected. That is, the digital phase shift circuit is a unit in the configuration of the actual digital phase shifter, and dozens of digital phase shift circuits are cascade-connected to exhibit a desired function.

In the configuration of the digital phase shifter, when the digital phase shift circuits were connected in a row, a length of the digital phase shifter is increased. It is conceivable that in order to shorten the length of the digital phase shifter, the digital phase shifter have a bent configuration using a connecting portion such as a bend type line or the like having a bending structure.

RELATED ART DOCUMENTS

Non Patent Document

[Non Patent Document 1]

A Ka-band Digitally-Controlled Phase Shifter with sub-degree Phase Precision (2016, IEEE, RFIC)

SUMMARY OF INVENTION

Problem to be Solved by the Invention

Incidentally, since transfer characteristics of each of the digital phase shift circuits are considered to be described (represented) by the transfer function, it is conceivable that transfer characteristics are affected by the load connected before and behind. For example, when digital phase shift circuits having the same configuration as one digital phase shift circuit are connected before and behind the one digital phase shift circuit, transfer characteristics corresponding to those loads of the digital phase shift circuits are realized.

However, when the above-mentioned bend type line is connected to the digital phase shift circuit, since the bend type line has higher impedance than the digital phase shift circuit, in comparison with the case in which a digital phase shift circuit having the same configuration as one digital phase shift circuit is connected to the one digital phase shift circuit, impedance matching between the digital phase shift circuit and the bend type line is deteriorated. When the impedance matching is deteriorated in this way, a phase shift operation of the digital phase shifter may be affected.

In consideration of the above-mentioned circumstances, the present invention is directed to providing a digital phase shifter capable of reducing an influence on a phase shift operation due to a connecting portion.

Means for Solving the Problem

An aspect of the present invention is a digital phase shifter including: a first digital phase shift circuit group in which digital phase shift circuits are cascade-connected; a second digital phase shift circuit group in which digital phase shift circuits are cascade-connected; and a bend type connecting portion configured to connect a first digital phase shift circuit located at an end of the first digital phase shift circuit group and a second digital phase shift circuit located at an end of the second digital phase shift circuit group, the digital phase shift circuit including at least a signal line, a pair of inner lines provided on both sides of the signal line, a pair of outer lines provided on outer sides of the inner lines, a first ground conductor connected to one ends of the inner lines and one ends of the outer lines, a second ground conductor connected to the other ends of the outer lines, a pair of electronic switches provided between the other ends of the inner lines and the second ground conductor, and a capacitor electrically connected between the signal line and at least one of the first ground conductor and the second ground conductor, each of the digital phase shift circuits is a circuit set to a low delay mode in which a return current flows through the inner lines or a high delay mode in which a return current flows through the outer lines, and the connecting portion including: a first connection line configured to connect the signal line of the first digital phase shift circuit and the signal line of the second digital phase shift circuit; second connection lines configured to connect the inner lines of the first digital phase shift circuit and the inner lines of the second digital phase shift circuit; ground layers disposed above and below the first connection line and the second connection lines; and first via holes configured to connect at least the second connection lines and the ground layers.

According to the above-mentioned configuration, impedance of a bend line can be lowered, and an influence to the phase shift operation due to the connecting portion can be reduced.

In addition, the digital phase shift circuit according to the aspect of the present invention may include an electronic switch configured to switch whether the capacitor is connected between the signal line and at least one of the first ground conductor and the second ground conductor.

In addition, in the digital phase shift circuit according to the aspect of the present invention, the connecting portion may include a third connection line configured to connect the outer line of the first digital phase shift circuit and the outer line of the second digital phase shift circuit.

In addition, in the digital phase shift circuit according to the aspect of the present invention, the second connection lines may be disposed on both sides of the first connection line with separated from the first connection line by predetermined distances, and the predetermined distances may be smaller than distances by which the inner lines are separated from the signal line.

In addition, in the digital phase shift circuit according to the aspect of the present invention, the predetermined distances may be set to less than 10 μm.

In addition, in the digital phase shift circuit according to the aspect of the present invention, a width of the first connection line may be greater than a width of the signal line.

In addition, in the digital phase shift circuit according to the aspect of the present invention, the first connection line may be formed on a layer different from a conductor layer on which the signal line is formed, and the signal line and the first connection line may be connected by a second via hole.

In addition, the digital phase shift circuit according to the aspect of the present invention may further include a third digital phase shift circuit connected to the first digital phase shift circuit and the second digital phase shift circuit, and the connecting portion may include: a first connecting portion configured to connect the first digital phase shift circuit and the third digital phase shift circuit; and a second connecting portion configured to connect the second digital phase shift circuit and the third digital phase shift circuit.

In addition, in the digital phase shift circuit according to the aspect of the present invention, the first digital phase shift circuit group and the second digital phase shift circuit group may be arranged in parallel while being separated from each other.

Effects of the Invention

As described above, according to the present invention, it is possible to provide a digital phase shifter capable of reducing an influence to a phase shift operation due to a connecting portion.

EMBODIMENTS FOR CARRYING OUT THE INVENTION

Hereinafter, a digital phase shifter of an embodiment are described with reference to the accompanying drawings.

Figure 1:
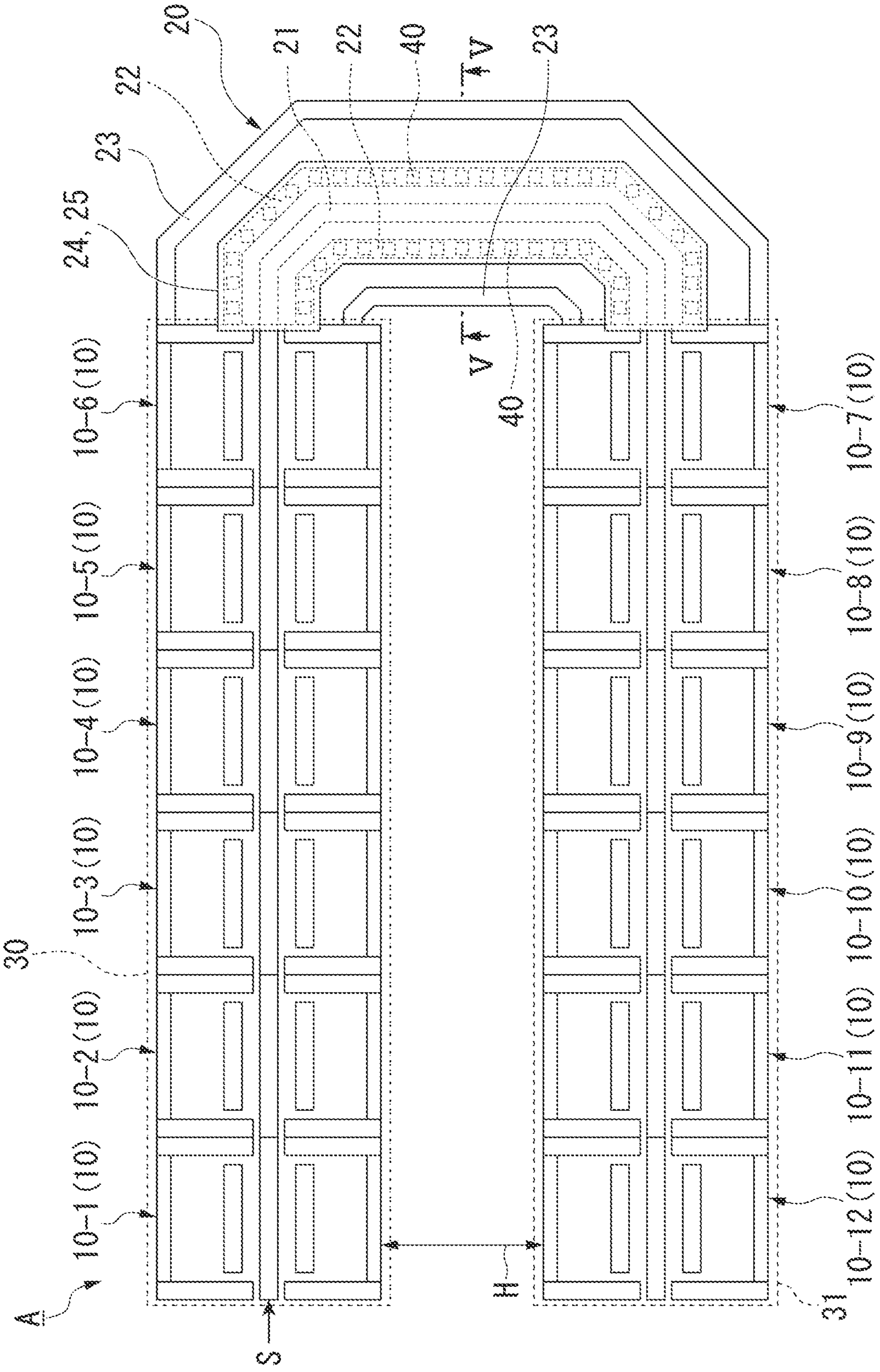
FIG. 1 is a schematic configuration view of a digital phase shifter according to the present embodiment.

FIG. 1 is a view showing a configuration example of a digital phase shifter A according to the present embodiment. The digital phase shifter A includes digital phase shift circuits 10 and a connecting portion 20. In the digital phase shifter A, a signal S with a predetermined frequency band is shifted by the digital phase shift circuits 10 that are cascade-connected. The signal S is a high frequency signal having a frequency band such as microwaves, sub-millimeter waves, millimeter waves, or the like.

The digital phase shift circuits 10 are electrically cascade-connected. In the example shown in FIG. 1, while twelve digital phase shift circuits 10 are cascade-connected, there is no limitation thereto and at least two or more digital phase shift circuits 10 may be cascade-connected. In the example shown in FIG. 1, for the convenience of description, the twelve cascade-connected digital phase shift circuits 10 are referred to as digital phase shift circuits 10-1, 10-2, to 10-12 in sequence of a flow of the signal S. However, a direction in which the signal S flows may be reversed.

The connecting portion 20 has a shape of a bend type. In the example shown in FIG. 1, the connecting portion 20 has a 1800 bend shape (a U-shaped bend form).

However, it is not limited thereto, and the connecting portion 20 may have a 90° bend shape or a 450 bend shape. The connecting portion 20 connects a first digital phase shift circuit located at an end of a first digital phase shift circuit group 30, and a second digital phase shift circuit located at an end of a second digital phase shift circuit group 31.

In the example shown in FIG. 1, the first to sixth digital phase shift circuits 10-1 to 10-6, which are cascade-connected, constitute the first digital phase shift circuit group 30. In addition, the seventh to twelfth digital phase shift circuits 10-7 to 10-12, which are cascade-connected, constitute the second digital phase shift circuit group 31. In other words, the digital phase shifter A includes the first digital phase shift circuit group 30 in which the digital phase shift circuits 10-1 to 10-6 are cascade-connected, and the second digital phase shift circuit group in which the digital phase shift circuits 10-7 to 10-12 are cascade-connected. Further, in the example shown in FIG. 1, the digital phase shift circuit 10-6 is an example of the first digital phase shift circuit, and the digital phase shift circuit 10-7 is an example of the second digital phase shift circuit.

The digital phase shifter A does not have a structure in which all of the digital phase shift circuits 10 are arranged in a row, but has a structure in which they are bent in the middle by the connecting portion 20. For example, the digital phase shifter A is bent as the first digital phase shift circuit group 30 and the second digital phase shift circuit group 31 are connected by the connecting portion 20. Accordingly, the first digital phase shift circuit group 30 and the second digital phase shift circuit group 31 are disposed in parallel.

The first digital phase shift circuit group 30 and the second digital phase shift circuit group 31 are disposed to be spaced apart from each other by a distance H. That is, the first digital phase shift circuit group 30 and the second digital phase shift circuit group 31 are disposed in parallel while being spaced apart from each other. In other words, adjacent outer lines 3 (to be described below) of the first digital phase shift circuit group 30 and the second digital phase shift circuit group 31 are spaced apart by the distance H between the first digital phase shift circuit group 30 and the second digital phase shift circuit group 31.

Figure 2:
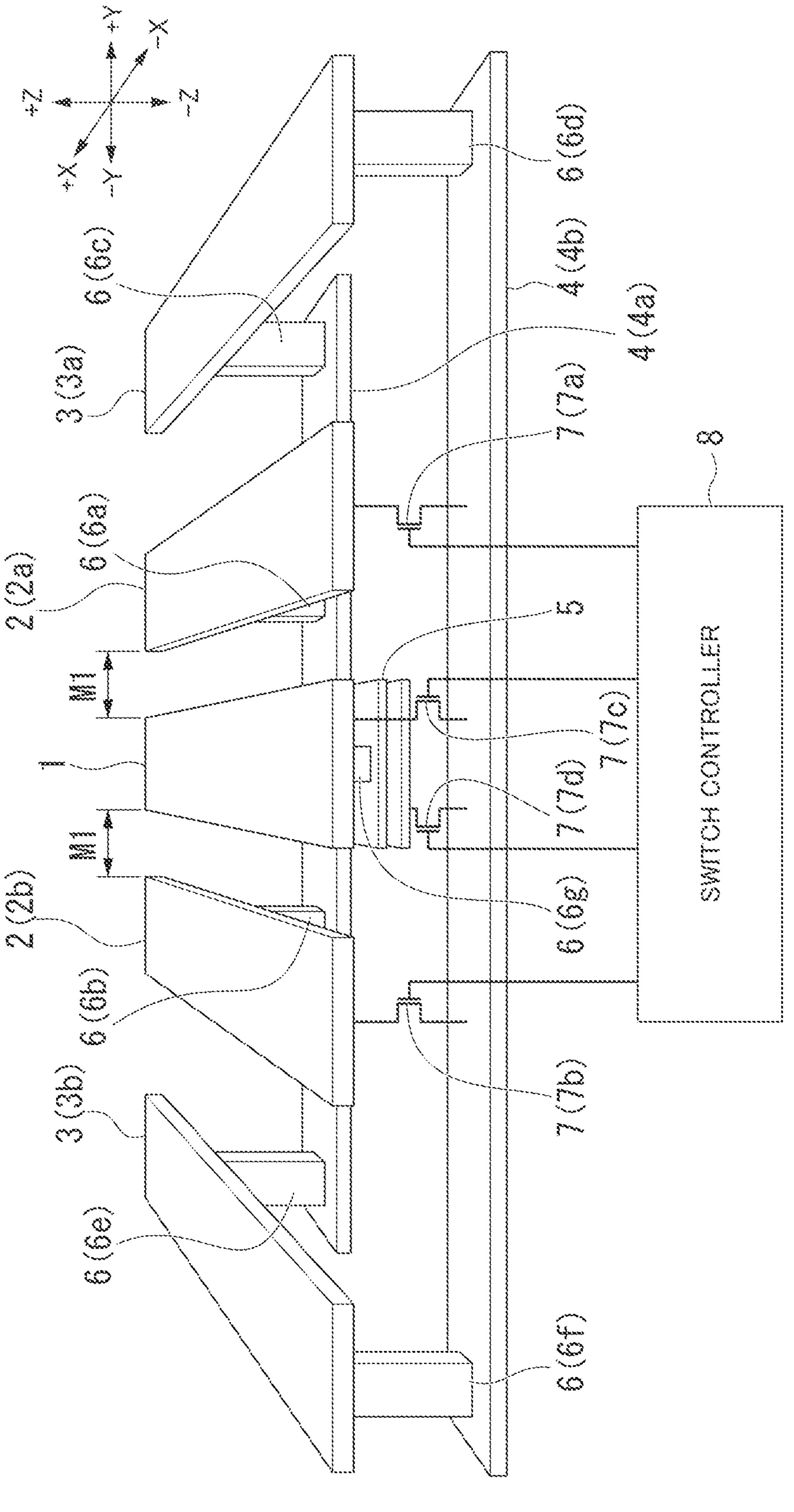
FIG. 2 is a perspective view of the digital phase shift circuit according to the present embodiment.

Hereinafter, a configuration of the digital phase shift circuit 10 according to the present embodiment are described with reference to FIG. 2. FIG. 2 is a perspective view of the digital phase shift circuit 10 according to the present embodiment. As shown in FIG. 2, the digital phase shift circuit 10 includes a signal line 1, two inner lines 2 (a first inner line 2*a* and a second inner line 2*b*), the two outer lines 3 (a first outer line 3*a* and a second outer line 3*b*), two ground conductors 4 (a first ground conductor 4*a* and a second ground conductor 4*b*), a parallel plate capacitor 5, a connection conductors 6, four electronic switches 7 (a first electronic switch 7*a*, a second electronic switch 7*b*, a third electronic switch 7*c* and a fourth electronic switch 7*d*), and a switch controller 8.

The signal line 1 is a linear beltlike conductor extending in a predetermined direction. That is, the signal line 1 is a long plate-shaped conductor having a fixed width W1, a fixed thickness and a predetermined length. In the example shown in FIG. 2, the signal S flows through the signal line 1 from a front side toward a back side.

Further, a forward/rearward direction shown in FIG. 2 is referred to as an X-axis direction, a leftward/rightward direction is referred to as a Y-axis direction, and an upward/downward direction (a vertical direction) is referred to as a Z-axis direction. In addition, a +X direction is a direction from a front side toward a back side in the X-axis direction, and a −X direction is a direction directed opposite to the +X direction. A +Y direction is a direction directed rightward in the Y-axis direction, and a −Y direction is a direction directed opposite to the +Y direction. A +Z direction is a direction directed upward in the Z-axis direction, and a −Z direction is a direction directed opposite to the +Z direction.

The first inner line 2*a* is a linear beltlike conductor. That is, the first inner line 2*a* is a long plate-shaped conductor having a fixed width, a fixed thickness and a predetermined length. The first inner line 2*a* extends in the same direction as the extension direction of the signal line 1. The first inner line 2*a* is provided parallel to the signal line 1 separated by a predetermined distance M1 from the signal line 1. Specifically, the first inner line 2*a* is disposed on one side of the signal line 1 separated by the predetermined distance M1. In other words, the first inner line 2*a* is disposed apart from the signal line 1 by the predetermined distance M1 in the +Y direction.

The second inner line 2*b* is a linear beltlike conductor. That is, like the first inner line 2*a*, the second inner line 2*b* is a long plate-shaped conductor having a fixed width, a fixed thickness and a predetermined length. The second inner line 2*b* extends in the same direction as the extension direction of the signal line 1. The second inner line 2*b* is provided parallel to the signal line 1 separated by the predetermined distance M1 from the signal line 1. Specifically, the second inner line 2*b* is disposed on the other side of the signal line 1 with separated by the predetermined distance M1. In other words, the second inner line 2*b* is disposed apart from the signal line 1 by the predetermined distance M1 in the −Y direction.

The first outer line 3*a* is a linear beltlike conductor provided on one side of the signal line 1 at a position farther from the signal line 1 than the first inner line 2*a*. That is, the first outer line 3*a* is a linear beltlike conductor disposed further in the +Y direction than the first inner line 2*a* (disposed spaced further apart from the signal line 1 than the first inner line 2*a* in the +Y direction). The first outer line 3*a* is a long plate-shaped conductor having a fixed width, a fixed thickness and a predetermined length. The first outer line 3*a* is provided parallel to the signal line 1 separated from the signal line 1 by a predetermined distance in a state in which the first inner line 2*a* is sandwiched between the signal line 1 and the first outer line 3*a*. Like the first inner line 2*a* and the second inner line 2*b*, the first outer line 3*a* extends in the same direction as the extension direction of the signal line 1.

The second outer line 3*b* is a linear beltlike conductor provided on the other side of the signal line 1 at a position farther from the signal line 1 than the second inner line 2*b*. That is, the second outer line 3*b* is a linear beltlike conductor disposed further in the −Y direction than the second inner line 2*b* (disposed spaced further apart from the signal line 1 than the second inner line 2*b* in the −Y direction). Like the first outer line 3*a*, the second outer line 3*b* is a long plate-shaped conductor having a fixed width, a fixed thickness and a predetermined length. The second outer line 3*b* is provided parallel to the signal line 1 with separated from the signal line 1 by a predetermined distance in a state in which the second inner line 2*b* is sandwiched between the signal line 1 and the first outer line 3*b*. Like the first inner line 2*a* and the second inner line 2*b*, the second outer line 3*b* extends in the same direction as the extension direction of the signal line 1.

The first ground conductor 4*a* is a linear beltlike conductor provided on one end side of the first inner line 2*a*, the second inner line 2*b*, the first outer line 3*a* and the second outer line 3*b*. The first ground conductor 4*a* is electrically connected to one ends of the first inner line 2*a*, the second inner line 2*b*, the first outer line 3*a* and the second outer line 3*b*. The first ground conductor 4*a* is a long plate-shaped conductor having a fixed width, a fixed thickness and a predetermined length.

The first ground conductor 4*a* is provided perpendicular to the first inner line 2*a*, the second inner line 2*b*, the first outer line 3*a* and the second outer line 3*b* extending in the same direction. That is, the first ground conductor 4*a* is disposed to extend in the Y-axis direction. The first ground conductor 4*a* is provided below the first inner line 2*a*, the second inner line 2*b*, the first outer line 3*a* and the second outer line 3*b* with separated by a predetermined distance.

In the example shown in FIG. 2, the first ground conductor 4*a* is set such that one end that is an end in the +Y direction of the first ground conductor 4*a* is located at substantially the same position as a right side edge portion of the first outer line 3*a*. In the example shown in FIG. 2, the first ground conductor 4*a* is set such that the other end that is an end in the −Y direction of the first ground conductor 4*a* is located at substantially the same position as a left side edge portion of the second outer line 3*b*.

The second ground conductor 4*b* is a linear beltlike conductor provided on the other end side of the first inner line 2*a*, the second inner line 2*b*, the first outer line 3*a* and the second outer line 3*b*. Like the first ground conductor 4*a*, the second ground conductor 4*b* is a long plate-shaped conductor having a fixed width, a fixed thickness and a predetermined length.

The second ground conductor 4*b* is disposed parallel to the first ground conductor 4*a*, and like the first ground conductor 4*a*, provided perpendicular to the first inner line 2*a*, the second inner line 2*b*, the first outer line 3*a* and the second outer line 3*b*. The second ground conductor 4*b* is provided below the first inner line 2*a*, the second inner line 2*b*, the first outer line 3*a* and the second outer line 3*b* with separated by a predetermined distance.

The second ground conductor 4*b* is set such that one end that is an end in the +Y direction of the second ground conductor 4*b* is located at substantially the same position as a right side edge portion of the first outer line 3*a*. The second ground conductor 4*b* is set such that the other end that is an end in the −Y direction of the second ground conductor 4*b* is located at substantially the same position as a left side edge portion of the second outer line 3*b*. In the example shown in FIG. 2, the second ground conductor 4*b* is located at the same position as the first ground conductor 4*a* in the Y-axis direction.

The parallel plate capacitor 5 is provided between the other end of the signal line 1 and the second ground conductor 4*b*. For example, the parallel plate capacitor 5 includes an upper electrode connected to the signal line 1 and a lower electrode electrically connected to the fourth electronic switch 7*d*. For example, the parallel plate capacitor 5 is a thin film capacitor having a structure of a metal insulator metal (MIM). Further, a capacitance value C of the digital phase shift circuit 10 includes a capacitance value Ca of the parallel plate capacitor 5. In addition, instead of the parallel plate capacitor 5, a comb type capacitor may be used.

The connection conductors 6 include at least connection conductors 6*a* to 6*f*. The connection conductor 6*a* is a conductor configured to electrically and mechanically connect one end of the first inner line 2*a* and the first ground conductor 4*a*. For example, the connection conductor 6*a* is a conductor extending in the Z-axis direction, and has one end (an upper end) connected to a lower surface of the first inner line 2*a* and the other end (a lower end) connected to an upper surface of the first ground conductor 4*a*.

The connection conductor 6*b* is a conductor configured to electrically and mechanically connect one end of the second inner line 2*b* and the first ground conductor 4*a*. For example, the connection conductor 6*b* is a conductor extending in the Z-axis direction like the connection conductor 6*a*, and has one end (an upper end) connected to a lower surface of the second inner line 2*b* and the other end (a lower end) connected to an upper surface of the first ground conductor 4*a*.

The connection conductor 6*c* is a conductor configured to electrically and mechanically connect one end of the first outer line 3*a* and the first ground conductor 4*a*. For example, the connection conductor 6*c* is a conductor extending in the Z-axis direction, and has one end (an upper end) connected to a lower surface in one end of the first outer line 3*a* and the other end (a lower end) connected to an upper surface of the first ground conductor 4*a*.

The connection conductor 6*d* is a conductor configured to electrically and mechanically connect the other end of the first outer line 3*a* and the second ground conductor 4*b*. For example, the connection conductor 6*d* is a conductor extending in the Z-axis direction, and has one end (an upper end) connected to a lower surface in the other end of the first outer line 3*a* and the other end (a lower end) connected to an upper surface of the second ground conductor 4*b*.

The connection conductor 6*e* is a conductor configured to electrically and mechanically connect one end of the second outer line 3*b* and the first ground conductor 4*a*. For example, the connection conductor 6*e* is a conductor extending in the Z-axis direction, and has one end (an upper end) connected to a lower surface in one end of the second outer line 3*b* and the other end (a lower end) connected to an upper surface of the first ground conductor 4*a*.

The connection conductor 6*f* is a conductor configured to electrically and mechanically connect the other end of the second outer line 3*b* and the second ground conductor 4*b*. For example, the connection conductor 6*f* is a conductor extending in the Z-axis direction, and has one end (an upper end) connected to a lower surface in the other end of the second outer line 3*b* and the other end (a lower end) connected to an upper surface of the second ground conductor 4*b*.

The connection conductor 6*g* is a conductor configured to electrically and mechanically connect the other end of the signal line 1 and the upper electrode of the parallel plate capacitor 5. For example, the connection conductor 6*g* is a conductor extending in the Z-axis direction, and has one end (an upper end) connected to a lower surface in the other end of the signal line 1 and the other end (a lower end) connected to an upper electrode of the parallel plate capacitor 5.

The first electronic switch 7*a* is connected to the other end of the first inner line 2*a* and the second ground conductor 4*b* therebetween. The first electronic switch 7*a* is, for example, a metal oxide semiconductor field effect transistor (MOSFET), and includes a drain terminal electrically connected to the other end of the first inner line 2*a*, a source terminal electrically connected to the second ground conductor 4*b*, and a gate terminal electrically connected to the switch controller 8.

The first electronic switch 7*a* is controlled to a closed state or an open state based on a gate signal input into the gate terminal from the switch controller 8. The closed state is a state in which the drain terminal and the source terminal are conducted. The open state is a state in which the drain terminal and the source terminal are not conducting and the electrical connection thereof is disconnected. The first electronic switch 7*a* is switched to a conduction state in which the other end of the first inner line 2*a* and the second ground conductor 4*b* are electrically connected or a disconnection state in which the electrical connection therebetween is disconnected under control of the switch controller 8.

The second electronic switch 7*b* is connected to the other end of the second inner line 2*b* and the second ground conductor 4*b* therebetween. The second electronic switch 7*b* is, for example, a MOSFET, and includes a drain terminal connected to the other end of the second inner line 2*b*, a source terminal connected to the second ground conductor 4*b*, and a gate terminal connected to the switch controller 8. For example, a size of the second electronic switch 7*b* is equal to or greater than a width of the second ground conductor 4*b*.

The second electronic switch 7*b* is controlled to a closed state or an open state based on the gate signal input to the gate terminal from the switch controller 8. The second electronic switch 7*b* is switched to a conduction state in which the other end of the second inner line 2*b* and the second ground conductor 4*b* are electrically connected or a disconnection state in which the electrical connection therebetween is disconnected under control of the switch controller 8.

The third electronic switch 7*c* is connected to the other end of the signal line 1 and the second ground conductor 4*b* therebetween. The third electronic switch 7*c* is, for example, a MOSFET, and includes a drain terminal connected to the other end of the signal line 1, a source terminal connected to the second ground conductor 4*b*, and a gate terminal connected to the switch controller 8. Further, in the example shown in FIG. 2, while the third electronic switch 7*c* is provided on the other end side of the signal line 1, it is not limited thereto and may also be provided on one end side of the signal line 1. Further, the third electronic switch 7*c* may not be used if not required.

The third electronic switch 7*c* is controlled to a closed state or an open state based on the gate signal input to the gate terminal from the switch controller 8. The third electronic switch 7*c* is switched to a conduction state in which the other end of the signal line 1 and the second ground conductor 4*b* are electrically connected or a disconnection state in which the electrical connection therebetween is disconnected under control of the switch controller 8.

The fourth electronic switch 7*d* is connected serially to the parallel plate capacitor 5 between the other end of the signal line 1 and the second ground conductor 4*b*. The fourth electronic switch 7*d* is, for example, a MOSFET. In the example shown in FIG. 2, the fourth electronic switch 7*d* includes a drain terminal connected to a lower electrode of the parallel plate capacitor 5, a source terminal connected to the second ground conductor 4*b*, and a gate terminal connected to the switch controller 8.

The fourth electronic switch 7*d* is controlled to a closed state or an open state based on the gate signal input to the gate terminal from the switch controller 8. The fourth electronic switch 7*d* is switched to a conduction state in which the lower electrode of the parallel plate capacitor 5 and the second ground conductor 4*b* are electrically connected or a disconnection state in which the electrical connection therebetween is disconnected under control of the switch controller 8.

The switch controller 8 is a control circuit configured to control the first electronic switch 7*a*, the second electronic switch 7*b*, the third electronic switch 7*c* and the fourth electronic switch 7*d*, which are the electronic switches 7.

For example, the switch controller 8 includes four output ports. The switch controller 8 individually controls the electronic switches 7 to an open state or a closed state by outputting individual gate signals from the individual output ports and supplying the signal to the individual gate terminals of the electronic switches 7.

While FIG. 2 shows a schematic perspective view of the digital phase shift circuit 10 such that a mechanical structure of the digital phase shift circuit 10 can be easily understood, the actual digital phase shift circuit 10 is formed as a multilayer structure by using a semiconductor manufacturing technology.

As an example, the digital phase shift circuit 10 includes the signal line 1, the first inner line 2*a*, the second inner line 2*b*, the first outer line 3*a* and the second outer line 3*b*, which are formed on a first conductive layer. The first ground conductor 4*a* and the second ground conductor 4*b* are formed on a second conductive layer facing the first conductive layer with the insulating layer sandwiched therebetween. The components formed on the first conductive layer and the components formed on the second conductive layer are mutually connected to each other through via-holes (via holes). The connection conductors 6 correspond to the via holes embedded in the insulating layer.

Figure 3:
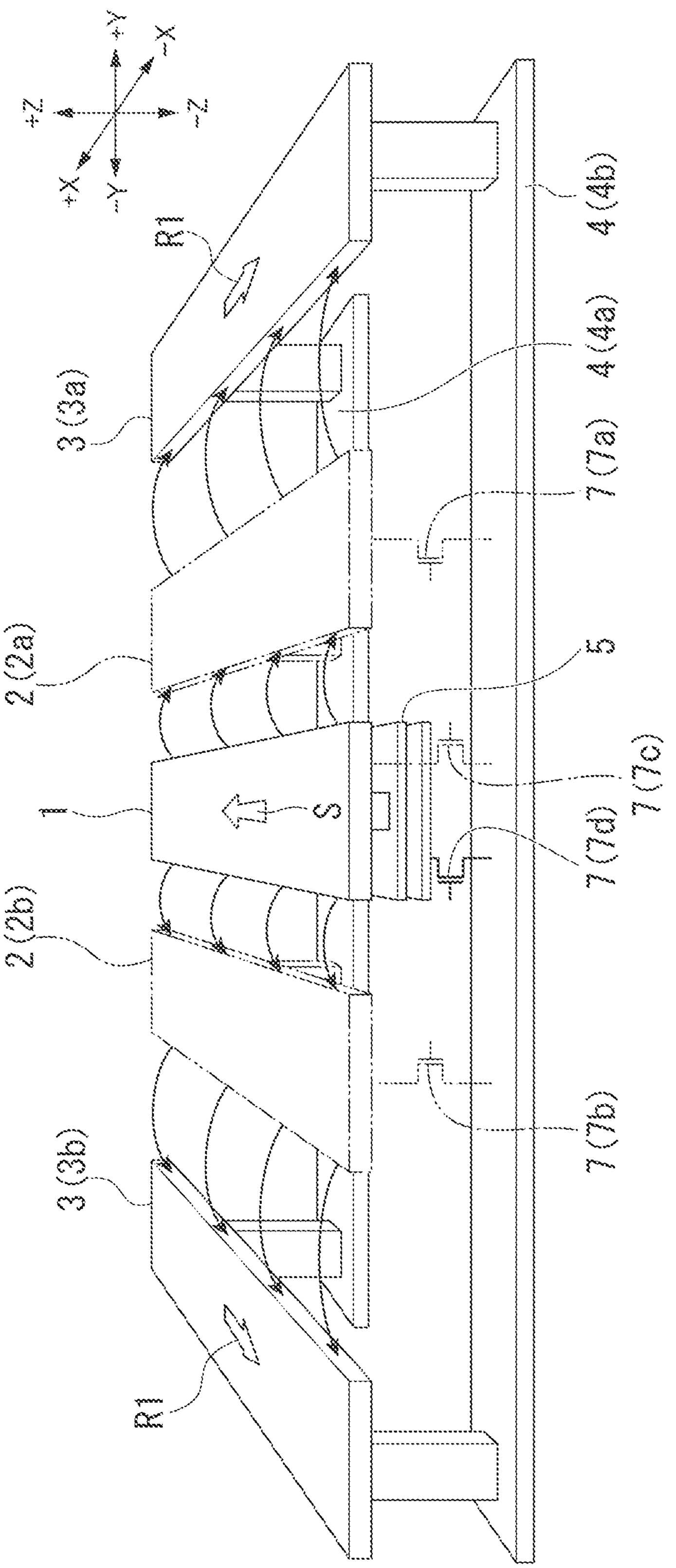
FIG. 3 is a view for describing a high delay mode according to the present embodiment.

Next, an operation of the digital phase shift circuit 10 according to the present embodiment are described with reference to FIG. 3 and FIG. 4. The digital phase shift circuit 10 has a high delay mode and a low delay mode, which are operation modes. The digital phase shift circuit 10 is operated in the high delay mode or the low delay mode.

(High Delay Mode)

The high delay mode is a mode of generating a first phase difference in the signal S. In the high delay mode, as shown in FIG. 3, the first electronic switch 7*a* and the second electronic switch 7*b* are controlled to the open state, and the fourth electronic switch 7*d* is controlled to the closed state.

When the first electronic switch 7*a* is controlled to the open state, the electrical connection between the other end of the first inner line 2*a* and the second ground conductor 4*b* is disconnected. When the second electronic switch 7*b* is controlled to the open state, the electrical connection between the other end of the second inner line 2*b* and the second ground conductor 4*b* is disconnected. When the fourth electronic switch 7*d* is controlled to the closed state, the other end of the signal line 1 is connected to the second ground conductor 4*b* through the parallel plate capacitor 5.

When the signal S is propagated from an input end (the other end) toward an output end (one end) through the signal line 1, a return current R1 flows from one end in a direction opposite to the signal S (a direction in which the signal S propagates) toward the other end. That is, the return current R1 is a current that flows in the −X direction that is a direction opposite to the signal S flowing in the +X direction. In the high delay mode, the first electronic switch 7*a* and the second electronic switch 7*b* are in the open state, the return current R1 mainly flows in the −X direction along the first outer line 3*a* and the second outer line 3*b* as shown in FIG. 3.

In the high delay mode, since the return current R1 flows through the first outer line 3*a* and the second outer line 3*b*, an inductance value L is higher than that in the low delay mode. In the high delay mode, a higher delay quantity than that in the low delay mode can be obtained. In addition, when the fourth electronic switch 7*d* is in the closed state, since the other end of the signal line 1 and the second ground conductor 4*b* are electrically connected by the parallel plate capacitor 5, the capacitance value C is also high. Accordingly, in the high delay mode, a higher delay quantity than that in the low delay mode can be obtained.

(Low Delay Mode)

The low delay mode is a mode of generating a second phase difference smaller than the first phase difference in the signal S. In the low delay mode, as shown in FIG. 4, the first electronic switch 7*a* and the second electronic switch 7*b* are controlled to the closed state, and the fourth electronic switch 7*d* is controlled to the open state.

When the first electronic switch 7*a* is controlled to the closed state, the other end of the first inner line 2*a* and the second ground conductor 4*b* are electrically connected. When the second electronic switch 7*b* is controlled to the closed state, the other end of the second inner line 2*b* and the second ground conductor 4*b* are electrically connected.

Figure 4:
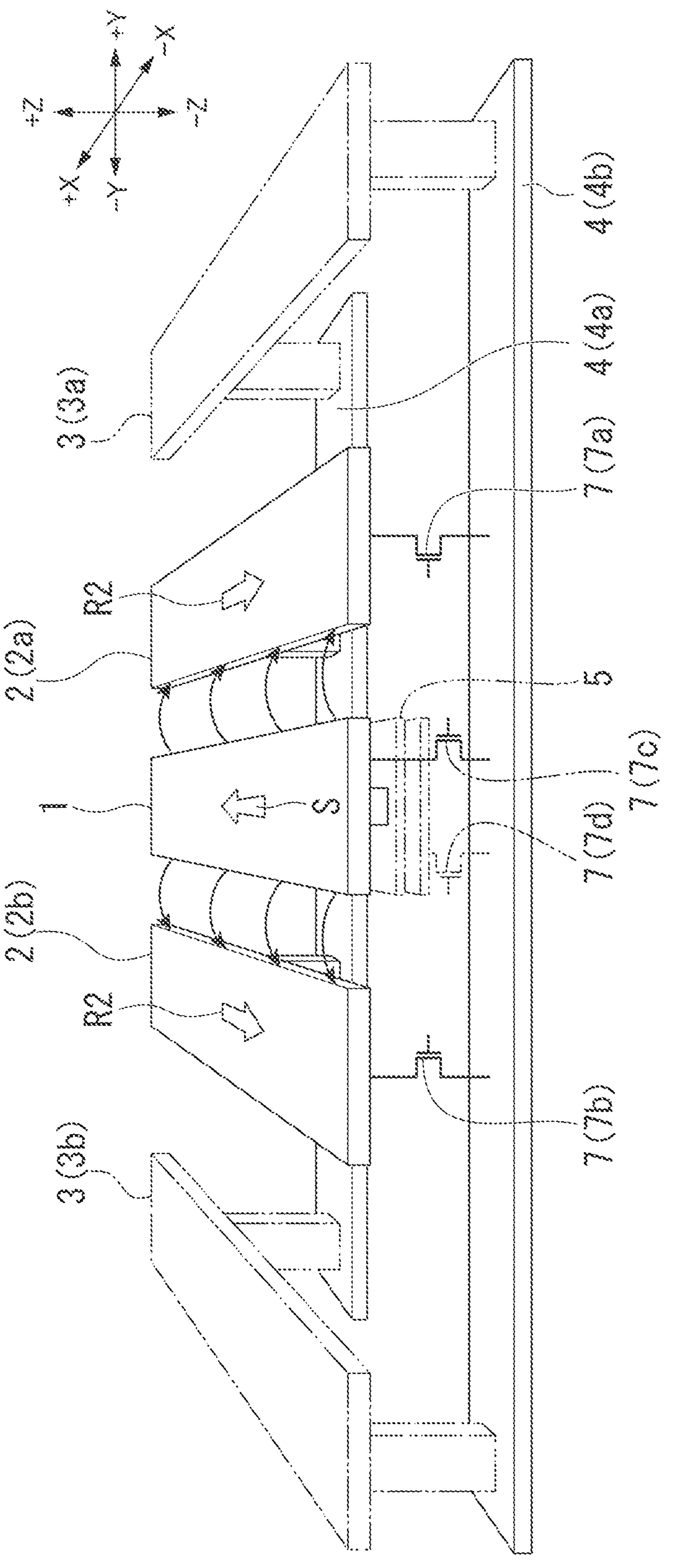
FIG. 4 is a view for describing a low delay mode according to the present embodiment.

In the low delay mode, since the first electronic switch 7*a* and the second electronic switch 7*b* are in the closed state, a return current R2 mainly flows in the −X direction through the first inner line 2*a* and the second inner line 2*b* as shown in FIG. 4.

In the low delay mode, since the return current R2 flows through the first inner line 2*a* and the second inner line 2*b*, the inductance value L is lower than that in the high delay mode. A delay quantity in the low delay mode is lower than a delay quantity in the high delay mode. In addition, while the parallel plate capacitor 5 is connected to the other end of the signal line 1, since the fourth electronic switch 7*d* is in the open state, the capacitance of the parallel plate capacitor 5 does not function and only a very small parasitic capacitance is present compared to the capacitance of the parallel plate capacitor 5. Accordingly, in the low delay mode, a delay quantity lower than that in the high delay mode can be obtained.

Here, in the low delay mode, when the third electronic switch 7*c* is controlled to the closed state, it is also possible to intentionally increase the loss of the signal line 1. This allows the loss of the high frequency signal in the low delay mode to be substantially the same as the loss of the high frequency signal in the high delay mode.

That is, the loss of the high frequency signal in the low delay mode is clearly smaller than the loss of the high frequency signal in the high delay mode. The loss difference therebetween causes an amplitude difference of the high frequency signal output from the digital phase shift circuit 10 when the operation mode is switched between the low delay mode and the high delay mode. In response to such circumstances, the digital phase shift circuit 10 can eliminate the amplitude difference by controlling the third electronic switch 7*c* to the closed state in the low delay mode.

Figure 5:
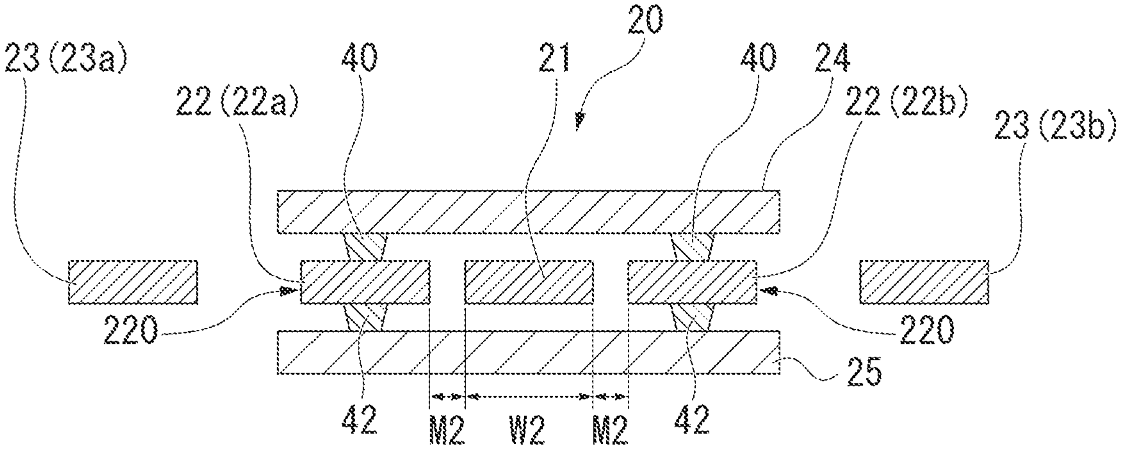
FIG. 5 is a first cross-sectional view of a connecting portion according to the present embodiment.

Hereinafter, the configuration of the connecting portion 20 according to the present embodiment are described with reference to FIG. 5. FIG. 5 is a cross-sectional view of the connecting portion 20 shown in FIG. 1 along line V-V. As shown in FIG. 5, the connecting portion 20 includes a first connection line 21, a second connection line 22, a third connection line 23, a first ground layer 24, and a second ground layer 25.

The first connection line 21 is, for example, a long plate-shaped conductor having a fixed width W2, a fixed thickness and a predetermined length. The first connection line 21 connects the signal line 1 of the first digital phase shift circuit and the signal line 1 of the second digital phase shift circuit. In the example shown in FIG. 1, the first connection line 21 has one end connected to the signal line 1 of the digital phase shift circuit 10-6 and the other end connected to the signal line 1 of the digital phase shift circuit 10-7. The signal S output from the signal line 1 of the digital phase shift circuit 10-6 is input to the signal line 1 of the digital phase shift circuit 10-7 through the first connection line 21. Further, the width W2 of the first connection line 21 may be the same as the width W1 of the signal line 1 or may be greater than the width W1.

The second connection line 22 is a long plate-shaped conductor having a fixed width, a fixed thickness and a predetermined length. The second connection line 22 extends in the same direction as the extension direction of the signal line 1. The second connection line 22 is provided parallel to the first connection line 21 with separated by a predetermined distance M2. Specifically, the second connection lines 22 are disposed on both sides of the first connection line 21 with separated from the first connection line 21 by the predetermined distance M2. Further, in the following description, the second connection line 22 disposed on one side of the first connection line 21 may be referred to as "a second connection line 22*a*" and the second connection line 22 disposed on the other side of the first connection line 21 may be referred to as "a second connection line 22*b*."

The predetermined distance M2 may be the same as the predetermined distance M1 or may be smaller than the predetermined distance M1. For example, when the predetermined distance M1 is 10 μm like in the related art (the prior art), the predetermined distance M2 may be less than 10 μm. More preferably, the predetermined distance M2 is, for example, 2.5 μm or 2 μm or less, and it is desirable to bring the second connection line 22 as close to the first connection line 21 as possible.

In the present embodiment, the second connection line 22 may be close to the first connection line 21 up to a production limit or nearly up to the production limit.

The second connection line 22 connects the inner line 2 of the first digital phase shift circuit and the inner line 2 of the second digital phase shift circuit. In the example shown in FIG. 1, the second connection line 22*a* has one end connected to the first inner line 2*a* of the digital phase shift circuit 10-6 and the other end connected to the first inner line 2*a* of the digital phase shift circuit 10-7. The second connection line 22*b* has one end connected to the second inner line 2*b* of the digital phase shift circuit 10-6 and the other end connected to the second inner line 2*b* of the digital phase shift circuit 10-7.

The third connection lines 23 are beltlike conductors provided on both of one side and the other side of the first connection line 21 at positions farther from the first connection line 21 than the second connection line 22. The third connection line 23 is provided parallel to the first connection line 21 while being separated from the first connection line 21 by a predetermined distance with the second connection line 22 sandwiched between the first connection line 21 and the third connection line 23. Further, in the following description, the third connection line 23 disposed on one side of the first connection line 21 may be referred to as "a third connection line 23*a*" and the third connection line 23 disposed on the other side of the first connection line 21 may be referred to as "a third connection line 23*b*."

The third connection line 23 connects the outer line 3 of the first digital phase shift circuit and the outer line 3 of the second digital phase shift circuit. In the example shown in FIG. 1, the third connection line 23*a* has one end connected to the first outer line 3*a* of the digital phase shift circuit 10-6 and the other end connected to the first outer line 3*a* of the digital phase shift circuit 10-7. The third connection line 23*b* has one end connected to the second outer line 3*b* of the digital phase shift circuit 10-6 and the other end connected to the second outer line 3*b* of the digital phase shift circuit 10-7.

The first ground layer 24 is disposed above the first connection line 21. In the example shown in FIG. 5, the first ground layer 24 is provided above the first connection line 21 and the second connection line 22 with separated by a predetermined distance. The first ground layer 24 is disposed above the first connection line 21, and the first ground layer 24 has a width such that it preferably extends at least to a side surface 220 of one side of each of the second connection lines 22. The side surface 220 is a side surface on a side opposite to a side where the first connection line 21 is disposed, in side surfaces of the second connection line 22. Further, the first ground layer 24 may extend not only above the first connection line 21 and the second connection line 22 but also above the third connection line 23.

The first ground layer 24 is connected to each of the second connection lines 22 through a via hole 40. That is, the first ground layer 24 is connected to each of the second connection line 22*a* and the second connection line 22*b* via the via hole 40. As shown in FIG. 1, the via holes 40 are arranged along the second connection line 22*a* and also arranged along the second connection line 22*b*.

Figure 6:
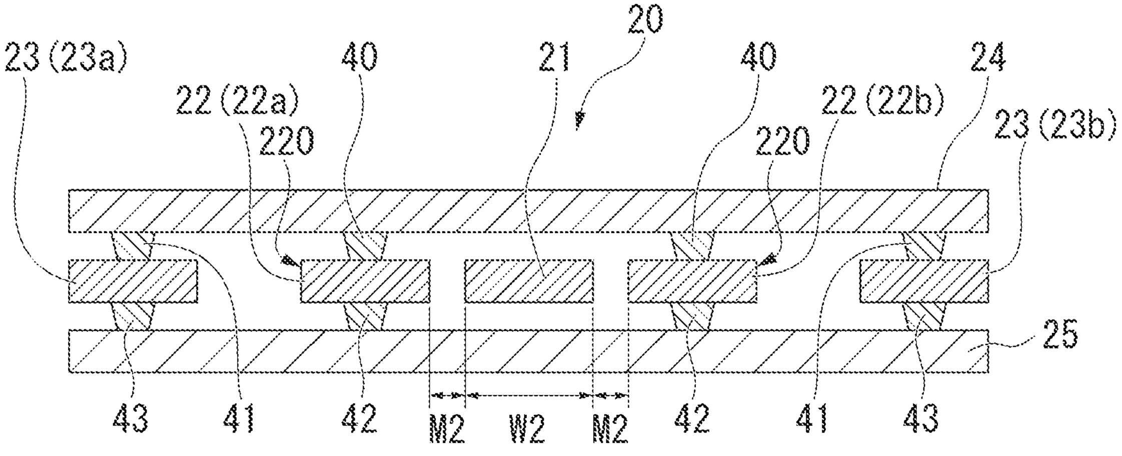
FIG. 6 is a second cross-sectional view of a connecting portion according to the present embodiment.

When the first ground layer 24 extends above the third connection line 23, as shown in FIG. 6, the first ground layer 24 may be connected to each of the second connection lines 22 through the via hole 40, and may be connected to each of the third connection line 23 through a via hole 41. That is, the first ground layer 24 may be connected to each of the second connection line 22*a* and the second connection line 22*b* through the via hole 40, and may be connected to each of the third connection line 23*a* and the third connection line 23*b* through the via hole 41. Further, in the configuration shown in FIG. 6, the via holes 41 are arranged along the third connection line 23*a* and also arranged along the third connection line 23*b*.

The second ground layer 25 is disposed below the first connection line 21. In the example shown in FIG. 5, the second ground layer 25 is provided below the first connection line 21 and the second connection line 22 with separated by a predetermined distance. The second ground layer 25 is disposed below the first connection line 21, and the second ground layer 25 has a width such that it extends preferably to at least the side surface 220 of one side of each of the second connection line 22. Further, the second ground layer 25 may extend not only below the first connection line 21 and the second connection line 22 but also below the third connection line 23.

The second ground layer 25 is connected to each of the second connection lines 22 through a via hole 42. That is, the second ground layer 25 is connected to each of the second connection line 22*a* and the second connection line 22*b* through the via hole 42. Like the via holes 40, the via holes 42 are arranged along the second connection line 22*a* and also arranged along the second connection line 22*b*.

When the second ground layer 25 extends to a position below the third connection line 23, as shown in FIG. 6, the second ground layer 25 may be connected to each of the second connection lines 22 through the via hole 42, and may be connected to each of the third connection lines 23 through a via hole 43. That is, the second ground layer 25 may be connected to each of the second connection line 22*a* and the second connection line 22*b* through the via hole 42, and may be connected to each of the third connection line 23*a* and the third connection line 23*b* through the via hole 43. Further, in the configuration exemplified in FIG. 6, like the via holes 41, the via holes 43 are arranged along the third connection line 23*a* and also arranged along the third connection line 23*b*.

In the example shown in FIG. 5 and FIG. 6, while the connecting portion 20 includes the first ground layer 24 and the second ground layer 25, it is not limited thereto and may include at least one of the first ground layer 24 and the second ground layer 25. That is, the ground layer may be disposed at least one of above and below the first connection line 21.

Hereinafter, features of the digital phase shifter A according to the present embodiment are described. In the structure that connects the digital phase shift circuits using the bend type line, the impedance of the bend type line may become a higher value than the optimum load that matches the digital phase shift circuit, and the phase shift operation of the digital phase shifter may be affected.

In the digital phase shifter A according to the present embodiment, the ground layers are disposed above and below the first connection line 21 and the second connection line 22. According to the above-mentioned configuration, a triplate line structure in which the first connection line 21 is sandwiched between the ground layers can be formed, and the impedance of the bend type connecting portion 20 can be lowered to reduce an influence to the phase shift operation.

In addition, the distance (the predetermined distance M2) between the first connection line 21 and the second connection line 22 may be smaller than the distance (the predetermined distance M1) between the signal line 1 and the inner lines 2. According to the above-mentioned configuration, the impedance of the connecting portion 20 can be further lowered.

The width W2 of the first connection line 21 may be greater than the width W1 of the signal line 1. According to the above-mentioned configuration, the impedance of the connecting portion 20 can be further lowered. Further, in the digital phase shifter A, the predetermined distance M2 may be smaller than the predetermined distance M1, and the width W2 may be greater than the width W1.

The first connection line 21 may be formed on a layer different from the conductor layer on which the signal line 1 is formed. In this case, the signal line 1 and the first connection line 21 may be connected by the via hole.

Hereinabove, while the present invention are described based on the preferred embodiment, the present invention is not limited to the above-mentioned embodiment and various modifications may be made without departing from the scope of the present invention. For example, in FIG. 1, while the case in which the digital phase shifter A includes the connecting portion 20 with a 1800 bend are described, it is not limited thereto, and as exemplified in FIG. 7, the two connecting portions 20 (the connecting portion 20*a* and the connecting portion 20*b*) with a 900 bend type may be provided.

Figure 7:
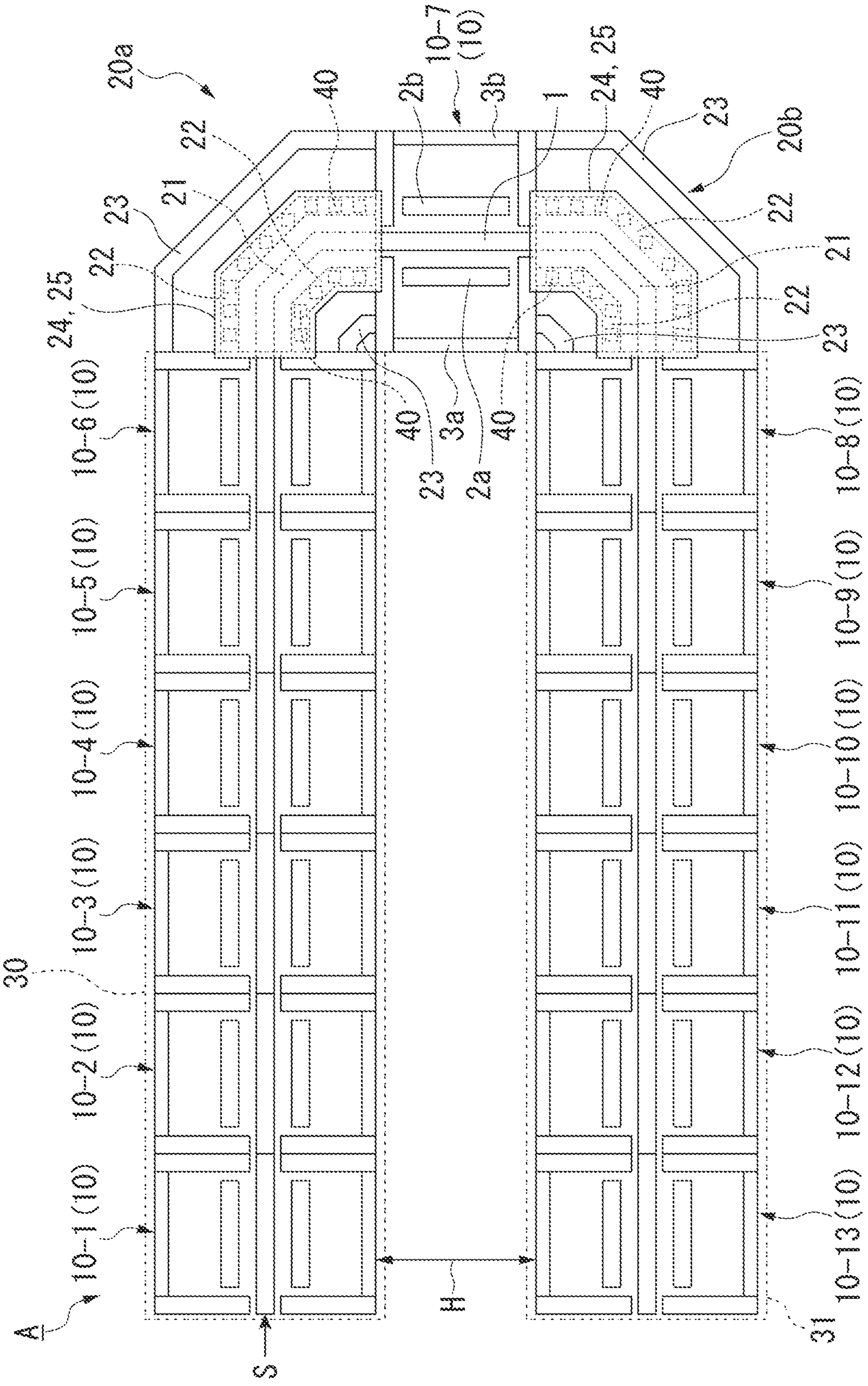
FIG. 7 is a view showing a variant of the digital phase shift circuit according to the present embodiment.

FIG. 7 is a variant of the digital phase shifter A according to the present embodiment. The digital phase shifter A shown in FIG. 7 includes the digital phase shift circuits 10-1 to 10-13. In the example shown in FIG. 7, the first to sixth digital phase shift circuits 10-1 to 10-6, which are cascade-connected, constitute the first digital phase shift circuit group 30. In addition, the eighth to thirteenth digital phase shift circuits 10-8 to 10-13, which are cascade-connected, constitute the second digital phase shift circuit group 31. In the example shown in FIG. 7, the digital phase shift circuit 10-6 is an example of the first digital phase shift circuit, and the digital phase shift circuit 10-8 is an example of the second digital phase shift circuit.

The digital phase shifter A shown in FIG. 7 further includes a third digital phase shift circuit connected to the first digital phase shift circuit and the second digital phase shift circuit. In FIG. 7, the digital phase shift circuit 10-7 is an example of the third digital phase shift circuit. The connecting portion 20*a* (the first connecting portion) shown in FIG. 7 is the connecting portion 20 that connects the digital phase shift circuit 10-6 and the digital phase shift circuit 10-7. The connecting portion 20*b* (the second connecting portion) shown in FIG. 7 is the connecting portion 20 that connects the digital phase shift circuit 10-8 and the digital phase shift circuit 10-7.

The first connection line 21 of the connecting portion 20*a* connects the signal line 1 of the digital phase shift circuit 10-6 and the signal line 1 of the digital phase shift circuit 10-7. The second connection lines 22 of the connecting portion 20*a* connects the inner lines 2 of the digital phase shift circuit 10-6 and the inner lines 2 of the digital phase shift circuit 10-7. The third connection lines 23 of the connecting portion 20*a* connects the outer lines 3 of the digital phase shift circuit 10-6 and the outer lines 3 of the digital phase shift circuit 10-7.

The first connection line 21 of the connecting portion 20*b* connects the signal line 1 of the digital phase shift circuit 10-8 and the signal line 1 of the digital phase shift circuit 10-7. The second connection lines 22 of the connecting portion 20*b* connects the inner lines 2 of the digital phase shift circuit 10-8 and the inner lines 2 of the digital phase shift circuit 10-7. The third connection lines 23 of the connecting portion 20*b* connects the outer lines 3 of the digital phase shift circuit 10-8 and the outer lines 3 of the digital phase shift circuit 10-7. Further, in the example shown in FIG. 7, the first outer line 3*a* of the digital phase shift circuit 10-6 and the first outer line 3*a* of the digital phase shift circuit 10-7 are connected, and the first outer line 3*a* of the digital phase shift circuit 10-8 and the first outer line 3*a* of the digital phase shift circuit 10-7 are connected. For this reason, the connecting portions 20*a* and 20*b* may not include the third connection line 23*a*.

REFERENCE SIGNS

- 1 Signal line
- 2 Inner line
- 2*a* First inner line
- 2*b* Second inner line
- 3 Outer line
- 3*a* First outer line
- 3*b* Second outer line
- 4 Ground conductor
- 4*a* First ground conductor
- 4*b* Second ground conductor
- 5 Parallel plate capacitor
- 6 Connection conductor
- 7 Electronic switch
- 7*a* First electronic switch
- 7*b* Second electronic switch
- 7*c* Third electronic switch
- 7*d* Fourth electronic switch
- 8 Switch controller
- 10 Digital phase shift circuit
- 20 Connecting portion
- 21 First connection line
- 22 Second connection line
- 23 Third connection line
- 24 First ground layer
- 25 Second ground layer
- A Digital phase shifter

The invention claimed is:

1. A digital phase shifter comprising:

a first digital phase shift circuit group in which digital phase shift circuits are cascade-connected;

a second digital phase shift circuit group in which digital phase shift circuits are cascade-connected; and a bend type connecting portion configured to connect a first digital phase shift circuit located at an end of the first digital phase shift circuit group and a second digital phase shift circuit located at an end of the second digital phase shift circuit group, wherein each of the digital phase shift circuits in the first digital phase shift circuit group and the digital phase shift circuits in the second digital phase shift circuit group includes at least a signal line, a pair of inner lines provided on both sides of the signal line, a pair of outer lines provided on outer sides of the inner lines, a first ground conductor connected to one ends of the inner lines and one ends of the outer lines, a second ground conductor connected to the other ends of the outer lines, a pair of electronic switches provided between the other ends of the inner lines and the second ground conductor, and a capacitor electrically connected between at least the signal line and at least one of the first ground conductor and the second ground conductor, each of the digital phase shift circuits in the first digital phase shift circuit group and the digital phase shift circuits in the second digital phase shift circuit group is a circuit set to a low delay mode in which a return current flows through the inner lines or a high delay mode in which a return current flows through the outer lines, and the connecting portion includes:

a first connection line configured to connect the signal line of the first digital phase shift circuit and the signal line of the second digital phase shift circuit;

second connection lines configured to connect the inner lines of the first digital phase shift circuit and the inner lines of the second digital phase shift circuit;

ground layers disposed above and below the first connection line and the second connection lines; and first via holes configured to connect at least the second connection lines and the ground layers.

2. The digital phase shifter according to claim 1, wherein each of the digital phase shift circuits in the first digital phase shift circuit group and the digital phase shift circuits in the second digital phase shift circuit group includes another electronic switch different from the pair of electronic switches configured to switch whether the capacitor is connected between the signal line and at least one of the first ground conductor and the second ground conductor.

3. The digital phase shifter according to claim 1, wherein the connecting portion includes a third connection line configured to connect one outer line of the pair of outer lines of the first digital phase shift circuit and one outer line of the pair of outer lines of the second digital phase shift circuit.

4. The digital phase shifter according to claim 1, wherein the second connection lines are disposed on both sides of the first connection line with separated from the first connection line by predetermined distances, and the predetermined distances are smaller than distances by which the inner lines are separated from the signal line.

5. The digital phase shifter according to claim 4, wherein the predetermined distances are set to less than 10 μm.

6. The digital phase shifter according to claim 1, wherein a width of the first connection line is greater than a width of the signal line.

7. The digital phase shifter according to claim 1, wherein the first connection line is formed on a layer different from a conductor layer on which the signal line is formed, and the signal line and the first connection line are connected by a second via hole.

8. The digital phase shifter according to claim 1, further comprising a third digital phase shift circuit connected to the first digital phase shift circuit and the second digital phase shift circuit, wherein the connecting portion includes:

a first connecting portion configured to connect the first digital phase shift circuit and the third digital phase shift circuit; and a second connecting portion configured to connect the second digital phase shift circuit and the third digital phase shift circuit.

9. The digital phase shifter according to claim 1, wherein the first digital phase shift circuit group and the second digital phase shift circuit group are arranged in parallel while being separated from each other.

* * * * *